US011979711B2

(12) United States Patent
Furuhira

(10) Patent No.: US 11,979,711 B2
(45) Date of Patent: May 7, 2024

(54) SPEAKER UNIT

(71) Applicant: AFUR CO., LTD., Tokyo (JP)

(72) Inventor: Akihiro Furuhira, Koshigaya (JP)

(73) Assignee: AFUR CO., LTD., Tokyo (JP)

( * ) Notice: Subject to any disclaimer, the term of this patent is extended or adjusted under 35 U.S.C. 154(b) by 193 days.

(21) Appl. No.: 17/771,934

(22) PCT Filed: Oct. 26, 2020

(86) PCT No.: PCT/JP2020/040147

§ 371 (c)(1),
(2) Date: Apr. 26, 2022

(87) PCT Pub. No.: WO2021/085392

PCT Pub. Date: May 6, 2021

(65) Prior Publication Data

US 2022/0386037 A1 Dec. 1, 2022

(30) Foreign Application Priority Data

Oct. 31, 2019 (JP) ................................ 2019-198801

(51) Int. Cl.
*H04R 25/00* (2006.01)
*H04R 17/00* (2006.01)

(52) U.S. Cl.
CPC .................................. *H04R 17/00* (2013.01)

(58) Field of Classification Search
USPC ........................................................ 381/191
See application file for complete search history.

(56) References Cited

U.S. PATENT DOCUMENTS

2006/0233404 A1* 10/2006 Croft ..................... H04R 31/00 381/191
2007/0154036 A1* 7/2007 Matsuzawa ........... H04R 1/403 381/116
2022/0408189 A1* 12/2022 Ostrup .................... H04S 7/303

FOREIGN PATENT DOCUMENTS

JP 2012-100055 A 5/2012
WO WO-2004075601 A1 * 9/2004 .............. H04N 5/45

OTHER PUBLICATIONS

Dec. 28, 2020 International Search Report issued in International Patent Application No. PCT/JP2020/040147.

* cited by examiner

*Primary Examiner* — Phylesha Dabney
(74) *Attorney, Agent, or Firm* — Oliff PLC

(57) ABSTRACT

A speaker unit that has a housing, a lower substrate that is fixed to the housing, a plurality of first ultrasonic vibrators that are arranged on the lower substrate, an upper substrate that is fixed to the housing and has a plurality of openings (OP) formed therein at locations that correspond to the first ultrasonic vibrators, and a plurality of second ultrasonic vibrators that are arranged on the upper substrate.

7 Claims, 7 Drawing Sheets

SPEAKER UNIT

TECHNICAL FIELD

The present invention relates to a parametric speaker.

BACKGROUND ART

One type of speaker is a so-called parametric speaker, which generates audible sound from ultrasonic vibrations that are generated by a piezoelectric element. Parametric speakers are advantageous in that they are able to readily impart directivity to an emitted acoustic wave. For example, there is known in the art an electro-acoustic transducer in which multiple piezoelectric elements are stacked and densely arranged (Patent Document 1 and the like).

On the other hand, there is a need for a speaker that can be carried around with ease to enjoy music on the go.

CITATION LIST

Patent Document

Patent Document 1: Japanese Patent Application Laid-Open No. 2012-100055

SUMMARY OF THE INVENTION

Problems to be Solved by the Invention

In the technique of Patent Document 1, sheet-like piezoelectric elements are stacked and electrically connected, and thus a resulting speaker may lack strength. When such a speaker is carried, it is susceptible to external vibration and shock.

An object of the present invention is to provide a parametric speaker that is suitable for portable use.

Means for Solving the Problems

According to one aspect of the present invention, there is provided a speaker unit that has a housing, a lower substrate that is fixed to the housing, a plurality of first ultrasonic vibrators that is arranged on the lower substrate, an upper substrate that is fixed to the housing and has a plurality of openings formed therein at locations that correspond to the first ultrasonic vibrators, and a plurality of second ultrasonic vibrators that is arranged on the upper substrate.

Effects of the Invention

The present invention provides a parametric speaker that is suitable for portable use.

MODE FOR CARRYING OUT THE INVENTION

Embodiments

Figure 1:
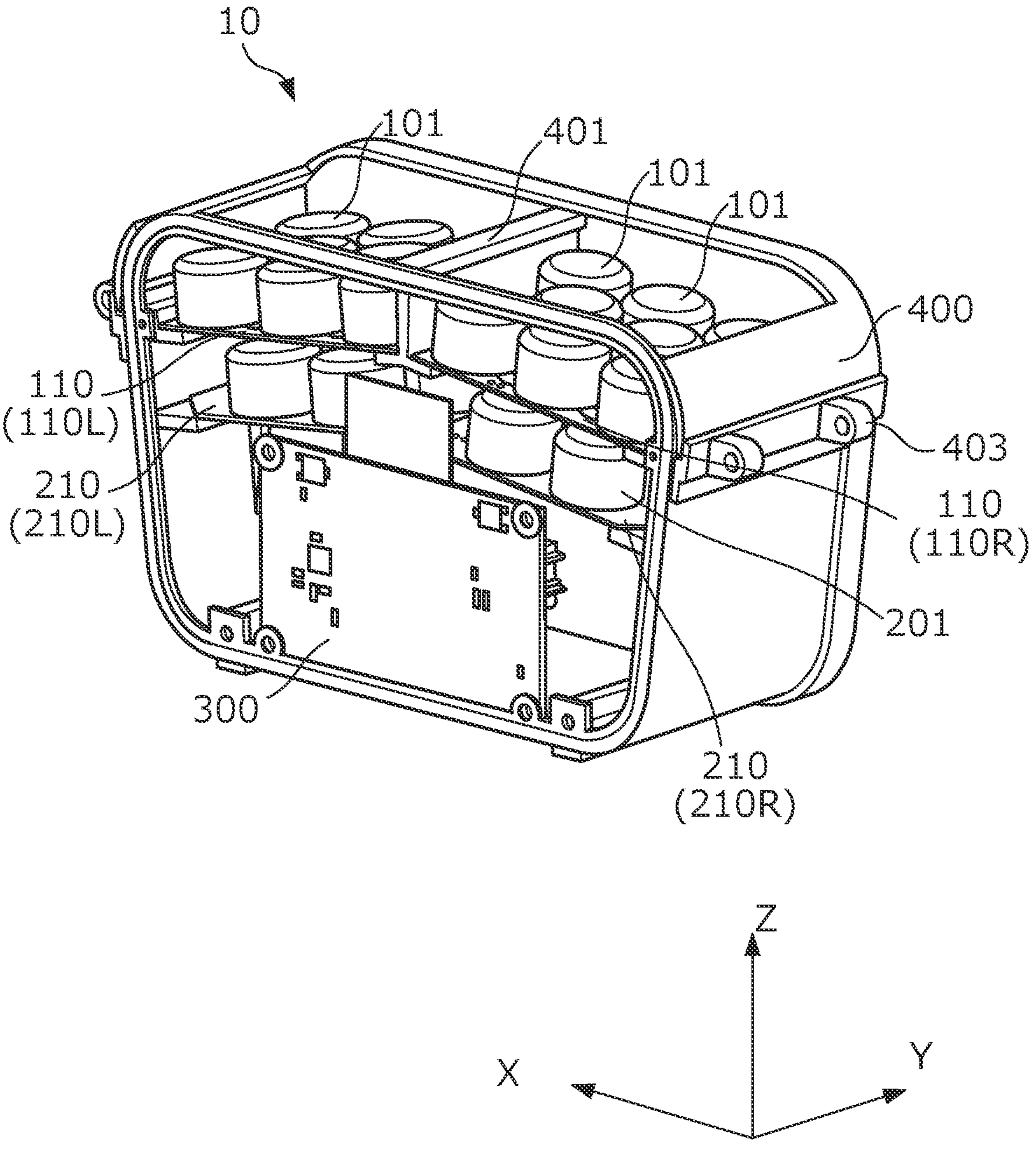
FIG. 1 is a perspective view illustrating the internal structure of a speaker unit 10.

FIG. 1 is a perspective view illustrating the internal structure of a speaker unit 10. Speaker unit 10 has a housing 400, a control unit 300 housed in housing 400, an upper substrate 110 as an upper base material, and a lower substrate 210 as a lower base material, and emits ultrasonic waves (and audible sound waves) upward (in the +Z direction).

Housing 400 has a generally rectangular parallelepiped shape as a whole, a horizontally long and generally rectangular shape when viewed from a direction perpendicular to the Z axis (height direction), a generally trapezoidal shape when viewed from a direction perpendicular to the Y axis (depth direction), and a vertically long and generally rectangular shape when viewed from a direction perpendicular to the X axis (width direction). An attachment part 403 is provided on each side of housing 400 in the X-axis direction. Further, a support 401 is formed along the Y-axis direction in the central portion. In addition, a battery, which is not illustrated, is mounted in the space below lower substrate 210. Although the surface where ultrasonic waves are emitted in the +Z-axis direction is open, the surface may optionally be covered with a non-woven fabric or other acoustically permeable material to prevent entry of dust.

Upper substrate 110 further includes an upper substrate 110L (left base material part) and an upper substrate 110R (right base material part). Similarly, lower substrate 210 further includes a lower substrate 210L (left base material part) and a lower substrate 210R (right base material part). Upper substrate 110L, upper substrate 110R, lower substrate 210L, and lower substrate 210R are each supported by support 401 and the inner wall of the X-direction side surface of housing 400. Lower substrate 210L and upper substrate 110L are fixed parallel to each other. Similarly, upper substrate 110R and lower substrate 210R are fixed parallel to each other.

A plurality of ultrasonic vibrators 201 (first ultrasonic vibrators) is provided on lower substrate 210. Similarly, a plurality of ultrasonic vibrators 101 (second ultrasonic vibrators) is provided on upper substrate 110.

In addition, on upper substrate 110, a plurality of openings is formed at locations that correspond to ultrasonic vibrators 101. The shapes or functions of ultrasonic vibrators 101 and ultrasonic vibrators 201 may be the same, or some of the shapes or functions thereof may differ.

Figure 2:
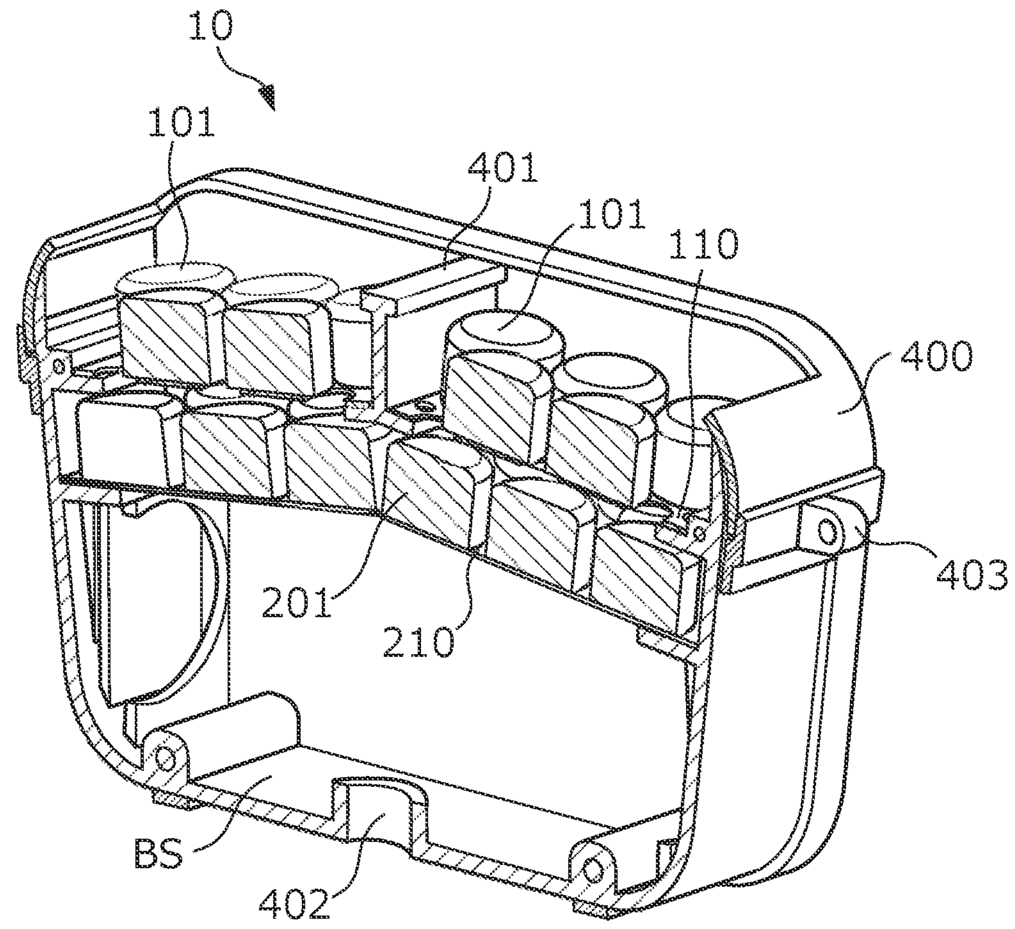
FIG. 2 is a cross-sectional perspective view illustrating the internal structure of speaker unit 10.

As illustrated in FIG. 2, upper substrate 110 and lower substrate 210 have respective heights H1 from the bottom surface BS at the central portion, and respective heights H2 (H1>H2) from the bottom BS at the edges (the longitudinal side inner walls and contact portions of housing 400). That is to say, upper substrate 110 and lower substrate 210 are inclined at equal angles in the +X and −X directions so that the height from the bottom BS is lower at each edge than at the central part. In other words, the longitudinal cross section is "mountain-shaped." In addition, a female thread for fixing 402 is formed in the bottom BS of housing 400.

Control unit 300 includes a substrate and a signal processing circuit such as a DSP, an amplifier, and the like provided on the substrate, and performs predetermined signal processing on a signal representing a musical sound or the like supplied from a portable music player or the like via a terminal or a wireless reception module, which are not illustrated. The signal output from control unit 300 is supplied to ultrasonic vibrators 101 and ultrasonic vibrators 201 via electrically connected upper substrate 110 and lower substrate 210, respectively. As a method of generating audible sound from ultrasonic waves, any one of the following methods may be used: a method of playing sound in an audible range in a space where ultrasonic waves intersect, by simultaneously generating ultrasonic waves with a certain frequency and frequency modulated (FM) ultrasonic waves; a method of applying amplitude modulation (AM), DSB modulation, SSB modulation, or the like to ultrasonic waves; and other methods.

Specifically, control unit 300 supplies L channel signals from the musical tone signals to ultrasonic vibrators 101 and ultrasonic vibrators 201 provided on upper substrate 110L and lower substrate 210L, respectively, and supplies R channel signals from the musical tone signals to ultrasonic vibrators 101 and ultrasonic vibrators 201 provided on upper substrate 110R and lower substrate 210R.

Figure 3:
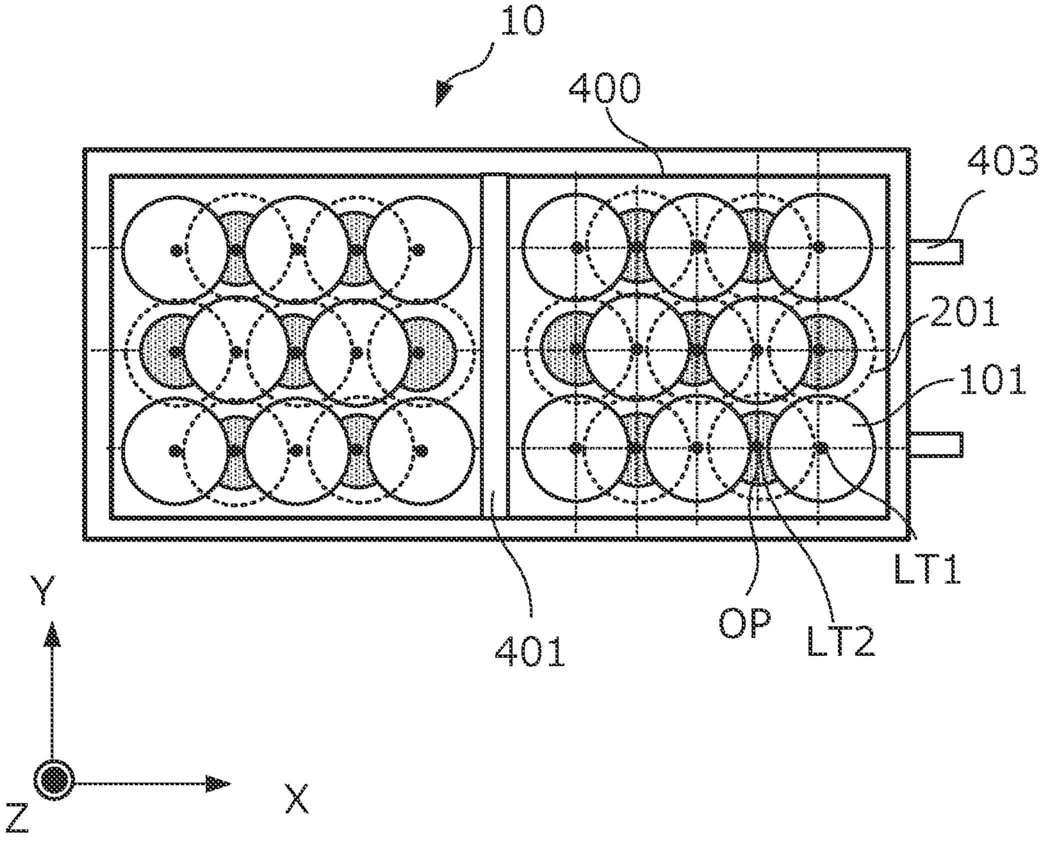
FIG. 3 is a diagram showing speaker unit 10 viewed from the sound emitting surface side.

The arrangement of ultrasonic vibrators 101, the ultrasonic vibrators 201, and the openings OP are described in detail below. FIG. 3 is a diagram showing speaker unit 10 viewed from the sound emitting surface side. In the following a case is described in which ultrasonic vibrators 101 and ultrasonic vibrators 201 have the same shape. In this diagram, broken lines indicate ultrasonic vibrators 201 partially hidden in upper substrate 110. That is, at least a part including the center of ultrasonic vibrators 201 is visible through the openings OP. In this example, there is a total of 14 ultrasonic vibrators 101 and 16 ultrasonic vibrators 201. Ultrasonic vibrators 101 and ultrasonic vibrators 201 are arrayed in a staggered grid as viewed from a direction perpendicular to the substrates. Specifically, the center of ultrasonic vibrator 101 (grid point LT1) and the center of ultrasonic vibrator 201 (grid point LT2) are on grid points, and grid points LT1 and LT2 are arranged alternately.

In the upper substrate 110, a plurality of openings OP is formed at locations that correspond to ultrasonic vibrators 201. To form openings OP, a well-known drilling process can be adopted. In this example, openings OP are circular, and have a smaller diameter than those of ultrasonic vibrators 101 (ultrasonic vibrators 201), and centers of openings OP coincide with centers of ultrasonic vibrators 201 (grid points LT2), as viewed from a direction perpendicular to upper substrate 110R. In this respect, spacings between the grid points in the X-axis direction are greater than at least the radiuses of ultrasonic vibrators 101 (and of ultrasonic vibrators 201).

The plurality of ultrasonic vibrators 201 and the plurality of ultrasonic vibrators 101 are arrayed such that at least the center position (grid points LT2) of ultrasonic vibrator 201 do not overlap with ultrasonic vibrators 101, as viewed from a direction perpendicular to each substrate.

Returning to FIG. 1, attachment part 403 is used to attach a fastening that enables speaker unit 10 to be worn on the user's body such that acoustic waves are emitted upward while speaker unit 10 is positioned on the user's chest or abdomen.

Figure 4:
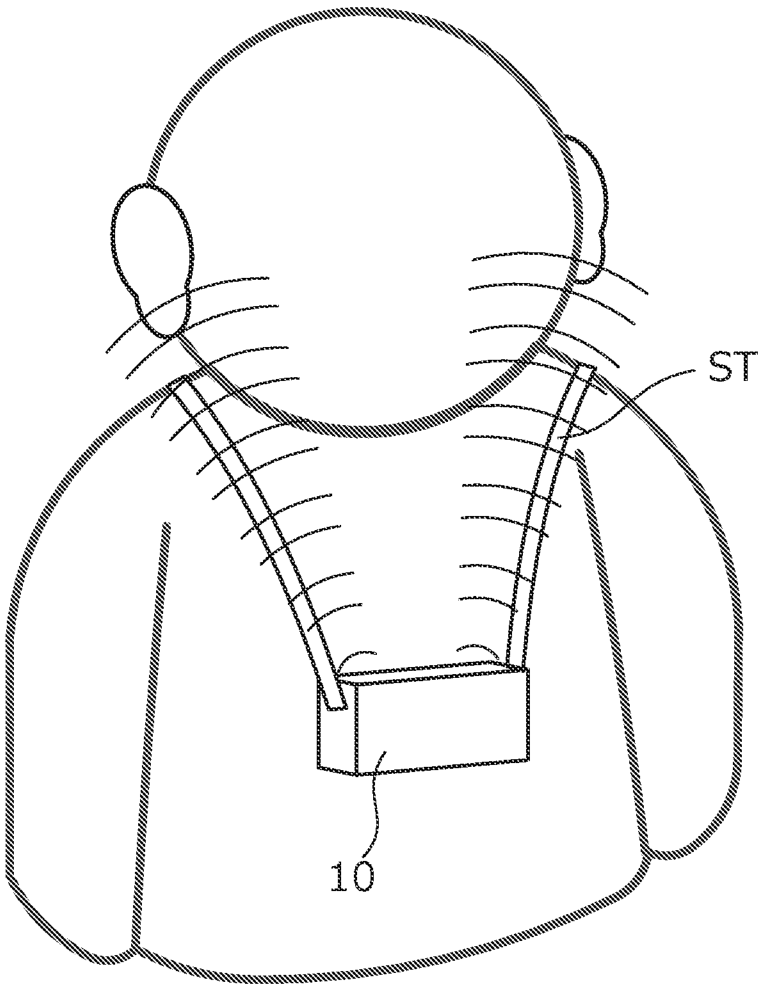
FIG. 4 is a diagram illustrating speaker unit 10 when worn.

FIG. 4 illustrates an example of a user wearing speaker unit 10 with a strap ST.

In this state, control unit 300 generates a control signal so that substantially only the L channel signal reaches a left ear and substantially only the R channel signal reaches a right ear.

In the above embodiment, in speaker unit 10, the respective ultrasonic vibrators are fixed to the substrates, and the respective substrates are fixed to housing 400. Therefore, there is a low risk that ultrasonic vibrators 101 and ultrasonic vibrators 201 will be damaged or become displaced from their installation positions if subject to external forces such as shock and vibration. In other words, speaker unit 10 has sufficient strength against impacts, and is suitable for use while being carried when walking and the like.

In addition, speaker unit 10 can be used when fastened to the user's chest, thus allowing the user to enjoy music and the like, hands-free and without using headphones or the like. Since speaker unit 10 can produce ultrasonic waves and audible sound that reach substantially only above speaker unit 10, about a problem of environmental sound leakage is obviated unlike, for example, a speaker that utilizes a coil or a cone-type diaphragm. Furthermore, speaker unit 10 is able to cause the acoustic waves of the L and R channels to reach respective ears, and thereby provide stereo reproduction.

Moreover, multiple ultrasonic vibrators are arranged in two stages and sound is emitted substantially only upward through the openings, thus making the device more compact and achieving an improvement in output power compared to a single stage arrangement.

OTHER EMBODIMENTS

Figure 5:
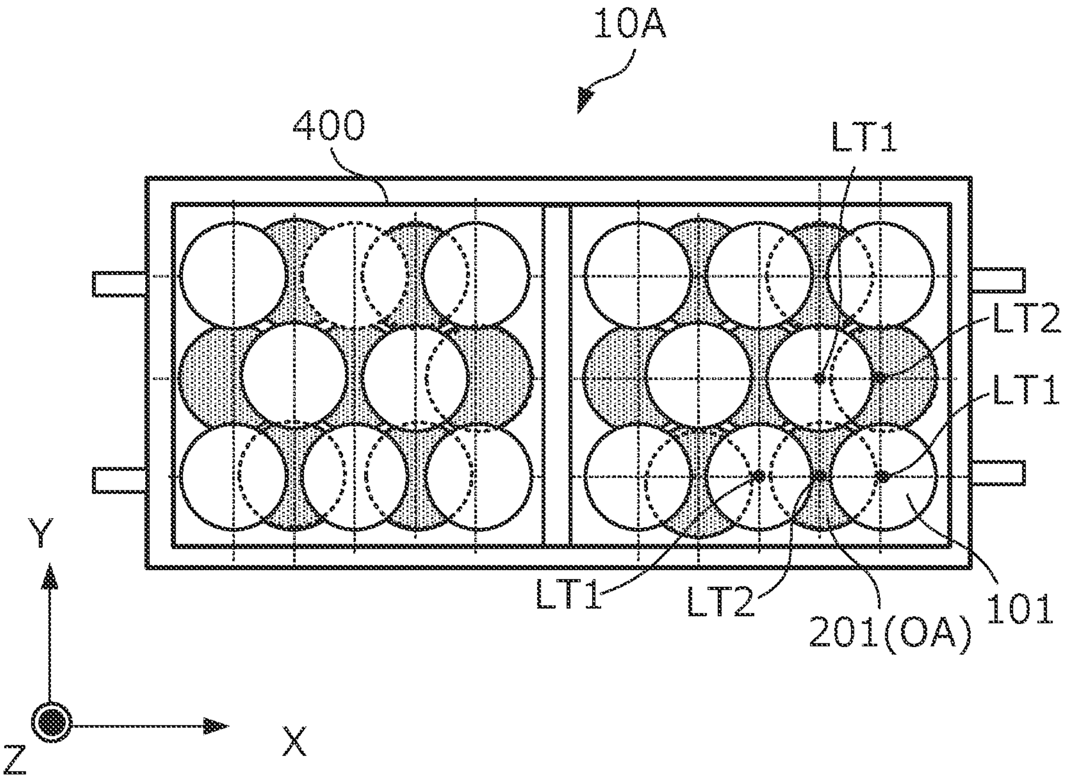
FIG. 5 is a diagram showing a speaker unit 10A viewed from the sound emitting surface side.

The arrangement of ultrasonic vibrators 101 and ultrasonic vibrators 201 is not limited to the arrangement illustrated in FIG. 3. FIG. 5 is a diagram showing a speaker unit 10A, where ultrasonic vibrators 101 and ultrasonic vibrators 201 are arranged differently from the arrangement in speaker unit 10, with speaker unit 10A being viewed from the sound emitting surface side. In this example, the size of the opening OP is the same as that of the ultrasonic vibrator 201.

In the example shown in FIG. 5, the area of opening OP is larger than in FIG. 3, and therefore although a strength of upper substrate 110 and that of lower substrate 210 is reduced, a ratio of acoustic waves from lower substrate 210 that pass through upper substrate 110 increases thereby increasing an available output power.

Figure 6:
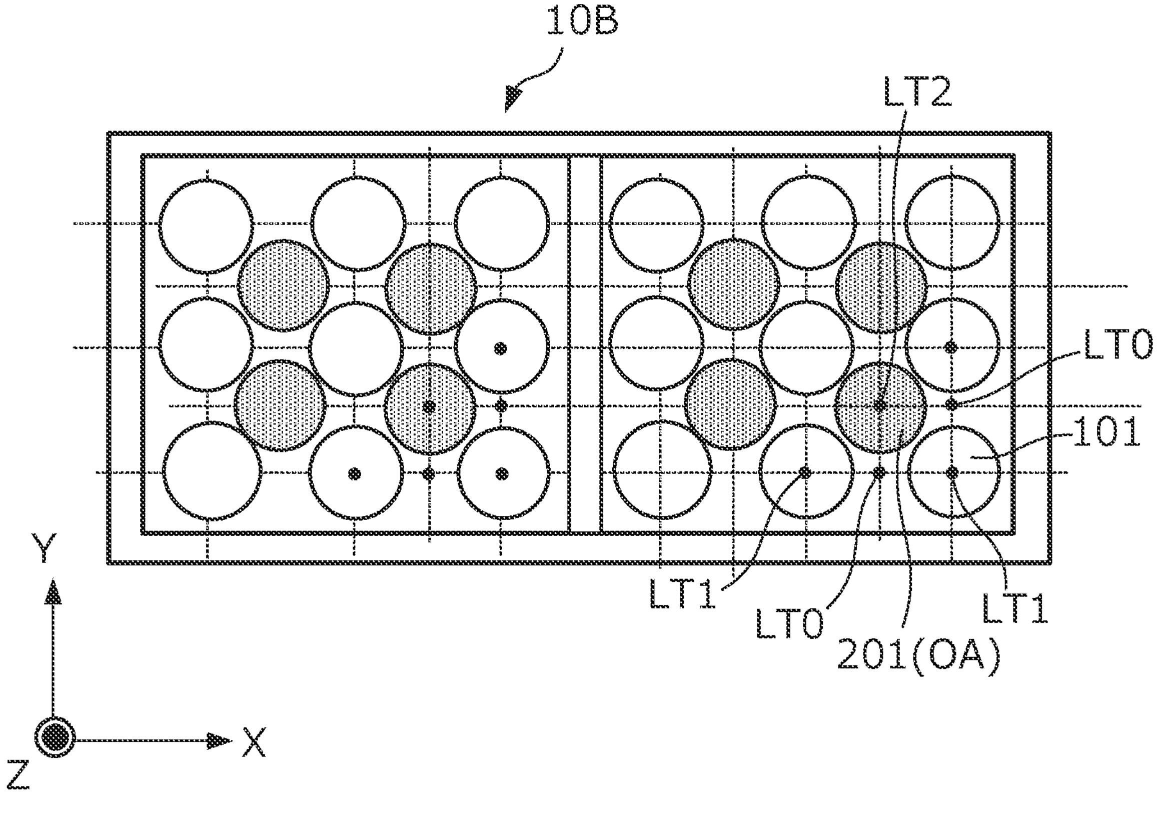
FIG. 6 is a diagram showing a speaker unit 10B viewed from the sound emitting surface side.

FIG. 6 is a diagram showing a speaker unit 10B, where ultrasonic vibrators 101 and ultrasonic vibrators 201 are arranged differently from the arrangement in speaker unit 10A, with speaker unit 10B being viewed from the sound emitting surface side. Among the grid points, there is one (LT0) that occupies neither the center of the ultrasonic vibrator 101 nor the ultrasonic vibrator 201 (opening OP), and either ultrasonic vibrators 101 or ultrasonic vibrators 201 are placed at the grid points of the same row or column.

In this example, the size (mounting density) of ultrasonic vibrators 101 and ultrasonic vibrators 201 with respect to the substrate surface is reduced, but the strength is higher than that in FIG. 5. If the size of ultrasonic vibrators 101 and ultrasonic vibrators 201 is the same as in FIG. 3 and in FIG. 5, the size of the entire housing will be larger.

In short, the speaker unit according to the present invention only needs to include a housing, a lower substrate that is fixed to the housing, a plurality of first ultrasonic vibrators that is arranged on the lower substrate, an upper substrate that is fixed to the housing and has a plurality of openings formed therein at locations that correspond to the first ultrasonic vibrators, and a plurality of second ultrasonic vibrators that is arranged on the upper substrate. Preferably, the center of the opening matches the center of the first ultrasonic vibrator. Therefore, for example, the signal processing circuit and the amplifier may be omitted from control unit 300, and only the function of supplying a signal input from the external device to ultrasonic vibrators 101 and ultrasonic vibrators 201 may be implemented in speaker unit 10.

In the above description, the term "correspond to" does not mean only that the center of the opening OP exactly matches the center of ultrasonic vibrator 201. Some of the ultrasonic waves emitted from the ultrasonic vibrators 201 only need to be able to pass through openings OP and reach upward. Therefore, the outer shape and size of opening OP may be different from the outer shape and size of ultrasonic vibrator 201. For example, the outer shape of the opening need not form an arc and may be rectangular.

In addition, the shape of each of ultrasonic vibrators 101 and ultrasonic vibrators 201 is not limited to the shape of a round column and may be a hexagonal column.

As an orthosis is able to be attached to the attachment part 403, a belt-type harness that is wrapped around the user's torso may be used in addition to or instead of the strap that hangs around the user's neck.

Speaker unit 10 may further include a mechanism for varying a tilt angle of upper substrate 110 or ultrasonic vibrators 201. The user adjusts the mechanism so that an optimum audible sound reaches each ear according to a relationship between a position at which speaker unit 10 is fastened and a position at the ear. For example, a slider mechanism and a stopper mechanism that move in the Z-axis direction are provided on the side surface of speaker unit 10 in the X-axis direction. This mechanism is mechanically interlocked with a knob provided so as to protrude from the housing side surface, and the user adjusts the tilt angle by operating the knob.

Substrates, each having ultrasonic vibrators provided thereon, may be stacked in an arrangement of three or more stages. In this case, it is preferable to array the vibrators so that at least a part of the sound emitting surface of the vibrator in the lowermost stage does not overlap with vibrators in the middle and uppermost stages.

Figure 7:
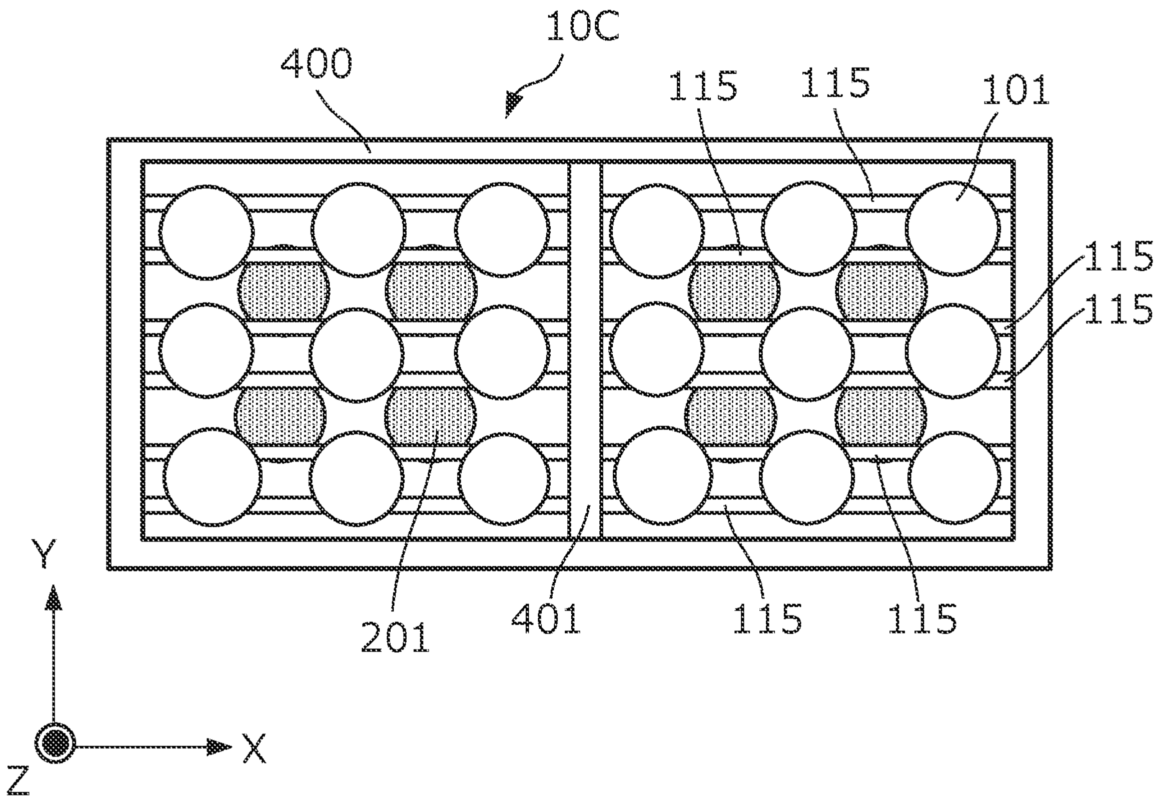
FIG. 7 is a diagram showing a speaker unit IOC viewed from the sound emitting surface side.

Further, a member other than a flat-plate member may be used as the base material. For example, as illustrated in FIG. 7, a plurality of wire rods 115 fixed to housing 400 and electrically connected to control unit 300 is provided, instead of upper substrate 110. The wire rods 115 are conductive and have an elongated prismatic shape. In this example, each vibrator is supported by two rail-shaped wire rods 115, but the number, thickness, and shape of the wire rods are not limited thereto. For example, an upper base material (and lower base material) with openings may be formed by braiding a wire into a given shape (for example, a honeycomb structure) to support ultrasonic vibrators 101 and/or ultrasonic vibrators 201 by way of the base material.

Each ultrasonic vibrator 101 is fixed to wire rods 115 by soldering or the like, and thus is able to operate by receiving an electric signal from control unit 300. In the case illustrated in this diagram, more space can be secured for passage of ultrasonic vibrations emitted from each ultrasonic vibrator 201, as compared with the case of using the plate-like member as illustrated in FIG. 3. In addition, there is no need to drill holes in the substrate to match the arrangement of the ultrasonic vibrators 101 and the ultrasonic vibrators 201.

The tilt direction of upper substrate 110 and/or lower substrate 210 is variable. For example, in upper substrate 110 and/or lower substrate 210, a portion inclined in a longitudinal direction and a portion inclined in a lateral direction may be provided as illustrated in FIGS. 1 and 2. In this case, sound can be emitted in four different directions.

DESCRIPTION OF REFERENCE NUMERALS

10 speaker unit
400 housing
401 support
402 female thread for fixing
403 attachment part
300 control unit
110, 110L, 110R upper substrate
210, 210L, 210R lower substrate
115 wire rod
101, 201 ultrasonic vibrator

The invention claimed is:

1. A speaker unit comprising:
a housing;
a lower substrate that is fixed to the housing;
a plurality of first ultrasonic vibrators that is arranged on the lower substrate;
an upper substrate that is fixed to the housing and has a plurality of openings formed therein at locations that correspond to the first ultrasonic vibrators; and
a plurality of second ultrasonic vibrators that is arranged on the upper substrate.

2. The speaker unit according to claim 1, wherein at least one of the lower base material and the upper base material is inclined so that a height from the bottom is lower at the edges than at the central part.

3. The speaker unit according to claim 2, wherein:
at least one of the lower base material and the upper base material, the base materials being inclined so that the height from the bottom is lower at the edges than at the central part, includes a left base material part and a right base material part;
L channel signals are supplied to the ultrasonic vibrators provided in the left base material part; and
R channel signals are supplied to the ultrasonic vibrators provided in the right base material part.

4. The speaker unit according to claim 1, wherein the upper base material is a plurality of wire rods that supplies signals to the second ultrasonic vibrators.

5. The speaker unit according to claim 1, further comprising a mechanism for attaching a fastening for the speaker unit to be worn on a user's body so that acoustic waves are emitted upward with the speaker unit located on the user's chest or abdomen.

6. The speaker unit according to claim 1, wherein the plurality of first ultrasonic vibrators and the plurality of second ultrasonic vibrators are arrayed in a staggered grid when viewed from a direction perpendicular to the base materials.

7. The speaker unit according to claim 1, wherein the plurality of first ultrasonic vibrators and the plurality of second ultrasonic vibrators are arrayed so that the center positions of the respective first ultrasonic vibrators do not overlap with the plurality of second ultrasonic vibrators when viewed from a direction perpendicular to the base materials.

* * * * *